(12) United States Patent
An et al.

(10) Patent No.: US 7,910,261 B2
(45) Date of Patent: Mar. 22, 2011

(54) CELL VOLTAGE MEASURER FOR FUEL CELL STACK AND FUEL CELL SYSTEM USING THE SAME

(75) Inventors: Jin Hong An, Yongin-si (KR); Seong Jin An, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1204 days.

(21) Appl. No.: 11/543,724

(22) Filed: Oct. 4, 2006

(65) Prior Publication Data

US 2007/0087237 A1    Apr. 19, 2007

(30) Foreign Application Priority Data

Oct. 7, 2005   (KR) .................. 10-2005-0094598

(51) Int. Cl.
*H01M 8/04* (2006.01)
*H01M 2/02* (2006.01)
*H01M 2/08* (2006.01)
*H01M 4/88* (2006.01)

(52) U.S. Cl. ...... 429/511; 429/432; 429/470; 312/223.6

(58) Field of Classification Search .............. 429/22–24, 429/34–37
See application file for complete search history.

(56) References Cited

U.S. PATENT DOCUMENTS

| 4,673,624 | A  | * | 6/1987 | Hockaday ................ 429/508 |
| 2003/0064261 | A1 | | 4/2003 | Kikuchi et al. |
| 2003/0072983 | A1 | * | 4/2003 | Kikuchi et al. ................ 429/23 |
| 2004/0197630 | A1 | | 10/2004 | Wilson et al. |
| 2004/0247986 | A1 | * | 12/2004 | Takeguchi et al. .............. 429/38 |
| 2005/0213409 | A1 | | 9/2005 | Wakahoi et al. |
| 2007/0212587 | A1 | * | 9/2007 | Fragiadakis et al. ............ 429/35 |

FOREIGN PATENT DOCUMENTS

| JP | 02-303791 | 12/1990 |
| JP | 07-282831 | 10/1995 |
| JP | 11-037112 | 2/1999 |

(Continued)

OTHER PUBLICATIONS

Patent Abstracts of Japan, Publication No. 2001-256992, Published on Sep. 21, 2001, in the name of Kanai, et al.

(Continued)

*Primary Examiner* — Ula C Ruddock
*Assistant Examiner* — Stephen Yanchuk
(74) *Attorney, Agent, or Firm* — Christie, Parker & Hale, LLP

(57) ABSTRACT

A cell voltage measurer of a fuel cell stack and a fuel cell system using the same, the cell voltage measurer including a plurality of terminals electrically connected to a plurality of separators of the stack, respectively; and a plurality of wiring lines coupled to at least one of a plurality of fastening mechanisms and electrically connected to the plurality of terminals, respectively. With this configuration, at least one of the wiring lines is blocked or prevented from being short-circuited by heat generated in the fuel cell stack, and has a sample structure to ease an wiring operation. Since the cell voltage of the fuel cell stack is stably measured to thereby measure (or check) the deterioration of a certain cell (or cell unit), the fuel cell stack is blocked or prevented from being suddenly stopped due to excess deterioration of the certain cell (or cell unit).

14 Claims, 4 Drawing Sheets

FOREIGN PATENT DOCUMENTS

| | | |
|---|---|---|
| JP | 3061602 | 6/1999 |
| JP | 2000-340249 | 12/2000 |
| JP | 2001-256992 | 9/2001 |
| JP | 2002-300496 | 10/2002 |
| JP | 2003-151613 | 5/2003 |
| JP | 2004-185940 | 7/2004 |
| JP | 2005-056910 | 3/2005 |
| WO | WO 03/083498 A1 | 10/2003 |

OTHER PUBLICATIONS

Japanese Office action dated March 30, 2010, for corresponding Japanese Patent application 2006-245936, noting listed references in this IDS.

European Search Report dated Apr. 28, 2010, for corresponding European Patent application 06121886.3, noting listed references in this IDS.

* cited by examiner

CELL VOLTAGE MEASURER FOR FUEL CELL STACK AND FUEL CELL SYSTEM USING THE SAME

CROSS-REFERENCE TO RELATED APPLICATION

This application claims priority to and the benefit of Korean Patent Application No. 10-2005-0094598, filed on Oct. 7, 2005, in the Korean Intellectual Property Office, the entire content of which is incorporated herein by reference.

BACKGROUND

1. Field of the Invention

The present invention relates to a fuel cell system, and more particularly, to a cell voltage measurer of a fuel cell stack and a fuel cell system using the same, in which a wiring line is protected and its structure is simplified.

2. Discussion of Related Art

A fuel cell is a power generation system that directly transforms chemical energy of fuel into electric energy by an electrochemical reaction. For example, a fuel cell can generate electric energy by using a reaction of hydrogen and oxygen to produce water. Representative examples of a fuel cell include phosphate fuel cells, molten carbonate fuel cells, solid oxide fuel cells, polymer electrolyte membrane fuel cells, and alkaline fuel cells, according to the kinds of electrolytes used.

A polymer electrolyte membrane fuel cell (PEMFC) has a relatively high output performance and a relatively quick start and response time. Also, the PEMFC can operate at a relatively low temperature. As such, the PEMFC can be used as a transportable power source for a portable electronic apparatus or a vehicle, as well as a distributed power source such as a stationary power plant for a house or a public structure.

Further, a direct methanol fuel cell (DMFC) is similar to the PEMFC because it uses a solid polymer as an electrolyte. However, the DMFC differs from the PEMFC in that its stack can be directly supplied with a liquid fuel such as methanol (without a reformer therebetween). Since the DMFC does not need to use a reformer, it can be smaller in size than the PEMFC.

Generally, a fuel cell (e.g., a PEMFC or a DMFC) includes a stack. Here, the stack includes a membrane electrode assembly (MEA), and a separator or a bipolar plate to supply fuel and an oxidant to an anode electrode and a cathode electrode of the MEA, respectively. The MEA and the separator (or the bipolar plate) form a cell unit (or unit cell) and are alternately stacked to form the stack.

A fuel cell stack including a plurality of stacked cell units (or unit cells) can be deteriorated after a long usage time. However, the plurality of stacked cell units are not uniformly deteriorated due to differences in their structure or position. For example, the pressure of the fuel supplied to the cell unit adjacent to an anode inlet is higher than that supplied to the cell unit adjacent to an anode outlet, so that the cell unit adjacent to the anode inlet is stressed and deteriorated more than the cell unit adjacent to the anode outlet. Thus, the lifespan of the conventional fuel cell stack is shortened due to the differences of the deteriorations of the cell units. Most of the conventional fuel cell stack is continuously used as long as the stack outputs a voltage higher than a referenced (or pre-determined) level even though a certain cell unit is more deteriorated than other cell units. However, the fuel cell stack may suddenly stop operating when the certain cell unit stop to operate due to the deterioration.

SUMMARY OF THE INVENTION

Accordingly, it is an aspect of the present invention to provide an apparatus for measuring a cell voltage of a fuel cell stack, and a fuel cell system using the same, in which a plurality of wiring lines to be electrically connected to cells are protected by a simple structure and its wiring structure is simplified.

In one embodiment, a cell voltage measurer for a fuel cell stack including: membrane-electrode assemblies and separators alternatively stacked with the membrane-electrode assemblies to form a stacked structure; a pair of end plates for supporting opposite sides of the stacked structure; and fastening mechanisms for fastening the pair of end plates, the cell voltage measurer including: a plurality of terminals electrically connected to the separators, respectively; and a plurality of wiring lines coupled to at least one of the fastening mechanisms and electrically connected to the plurality of terminals, respectively.

In another embodiment, a fuel cell system includes: a fuel cell stack including: a plurality of membrane-electrode assemblies, each of the membrane-electrode assemblies including an anode electrode, a cathode electrode, and an electrolyte membrane between the anode electrode and the cathode electrode; a plurality of separators alternatively stacked with the membrane-electrode assemblies to form a stacked structure; a pair of end plates supporting opposite sides of the stacked structure; and fastening mechanisms for fastening the pair of end plate; and a cell voltage measurer including a plurality of terminals electrically connected to the plurality of separators, respectively; and a plurality of wiring lines coupled to at least one of the fastening mechanisms and electrically connected to the plurality of terminals, respectively.

According one embodiment, the cell voltage measurer further includes: a voltage sensor electrically connected with the plurality of wiring lines and being adapted to sense one or more voltages applied at the plurality of wiring lines. In one embodiment, the voltage sensor includes: at least two switching units, each of the at least two switching units having a plurality of input terminals and an output terminal, and being adapted to selectively, electrically connect one of the input terminals with the output terminal; and a switching controller for sensing a voltage applied at the terminals of the at least two switching units and for controlling the at least two switching units.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
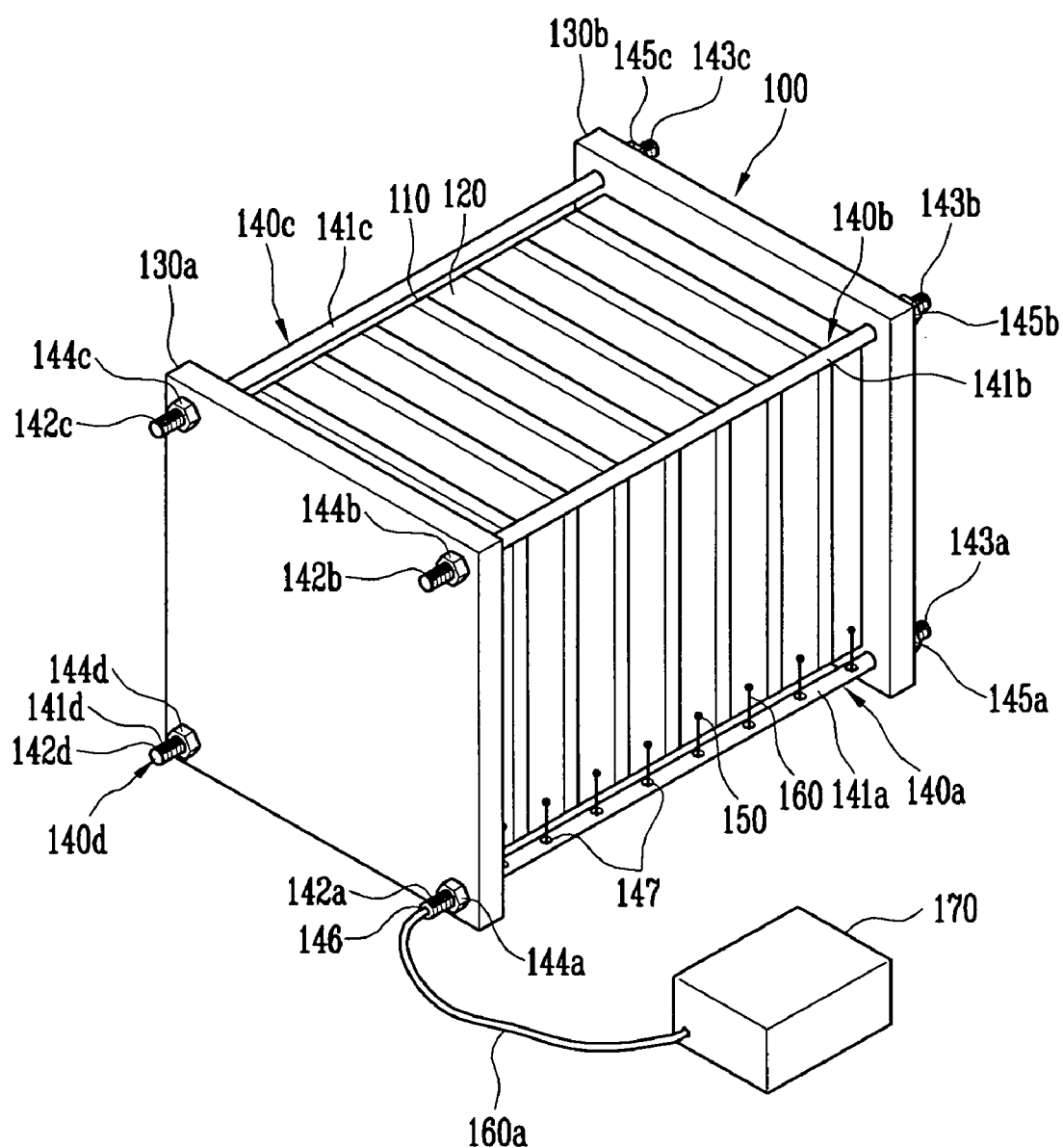
FIG. 1 is a perspective view of a cell voltage measurer for a fuel cell stack according to an embodiment of the present invention.

Hereinafter, exemplary embodiments according to the present invention will be described with reference to accompanying drawings, wherein like reference numerals refer to like elements.

FIG. 1 is a perspective view of a cell voltage measurer for a fuel cell stack 100 according to an embodiment of the present invention.

Referring to FIG. 1, the fuel cell stack 100 includes an MEA 110, a separator 120 coupled to opposite sides of the MEA 110, end plates 130a and 130b, and fastening mechanisms (e.g., fastening bars) 140a, 140b, 140c and 140d, which form one or more cell units (or unit cells). A cell voltage measurer according to an embodiment of the present invention is connected to the fuel cell stack 100 through at least one of the fastening mechanisms 140a, 140b, 140c and 140d of the fuel cell stack 100 to stably measure a cell voltage of each cell unit (or unit cell) provided in the fuel cell stack 100.

According to this embodiment, the cell voltage measurer includes a plurality of terminals 150 inserted in and fastened with each separator 120 of the fuel cell stack 100; and a plurality of wiring lines 160 electrically connected to each terminal 150. The plurality of wiring lines 160 are coupled to the fastening mechanisms (or fastening bar) 140a. Here, the fastening bar 140a is formed with a hollow (or cavity) 146 through which the plurality of wiring lines 160 pass, and one or more holes 147 respectively through which one or more of the wiring lines 160 pass. Further, the cell voltage measurer includes a voltage sensor 170 connected to the plurality of wiring lines 160 to measure one or more voltages respectively at one or more of the wiring lines 160.

In more detail, the MEA 110 has a structure such that an anode electrode (referred to as a "fuel electrode" or an "oxidation electrode") and a cathode electrode (referred to as an "air electrode" or a "reduction electrode") are attached to opposite sides of a polymer electrolyte membrane. The anode electrode is provided with a catalyst layer for oxidation of the fuel, and the cathode electrode is provided with a catalyst layer for reduction of an oxidant.

The separators 120 can be implemented by any suitable bipolar plates that include a first channel to supply the anode electrode with the fuel, and a second channel to supply the cathode electrode with the oxidant.

The MEA 110 and the separator 120 are alternatively stacked. Additionally, a gasket may be interposed between the MEA 110 and the separator 120 in order to block or prevent the fuel and the oxidant from leakage.

The end plates 130a and 130b are placed at the opposite sides of the stacked structure formed by the MEA 110 and the separator 120, and apply a certain (or predetermined) pressure from the opposite sides toward the center of the stacked structure.

The fastening mechanisms 140a, 140b, 140c and 140d connect the two end plates 130a and 130b, and apply a certain (or predetermined) fastening force to the two end plates 130a and 130b. In this embodiment, the fastening mechanisms 140a, 140b, 140c and 140d include treaded bodies 141a, 141b, 141c and 141d; opposite ends 142a, 143a, 142b, 143b, 142c, 143c, 142d and 143d; and nuts 144a, 145a, 144b, 145b, 144c, 145c, 144d and 145d.

In this embodiment, the fastening mechanisms 140a to which one or more of the wiring lines 160 are connected include the hollow 146 to which the plurality of wiring lines 160 are inserted, and the holes 147 through which the wiring lines 160 to be connected with one or more of the terminals 150 pass and which are placed corresponding to the separators 120 respectively connected with the terminals 150. The holes 147 may be implemented by an opening placed corresponding to the respective separators 120 and through which the hollow 146 is exposed; however, the invention is not thereby limited.

In one embodiment, the fastening mechanisms 140a include a material selected from a group consisting of metal, a complex material, and combination thereof.

The terminal 150 is electrically connected to the separator 120. The terminal 150 can be implemented by (or includes) an electrode pin. In one embodiment, the electrode pin is adapted to insert into a groove placed in a lateral side of a corresponding one of the separators 120. For example, in the case where the electrode pin is used as the terminal 150, the terminal 150 may be stuck like a needle into a carbon cloth forming the anode electrode and/or the cathode electrode to thereby allow for a stable connection between the terminal 150 and the carbon cloth. Alternatively, the terminal 150 may be implemented by a surface electrode using a suitable clip or adhesive.

The wiring line 160 allows the voltage at each terminal 150 to be applied to the voltage sensor 170. The wiring line 160 has a first end connected to the terminal 150 and a second end connected to the voltage sensor 170, and is extended through the hole 147 and the hollow 146 of the fastening bar 140a. The wiring line 160 can be implemented by a cable 160a that includes a plurality of wires surrounded with a coating layer for insulating and protecting the wires.

The voltage sensor 170 is connected to the plurality of terminals 150 connected to each cell unit (or unit cell) of the fuel cell stack 100 by the plurality of wiring lines 160, and measures a voltage level of each cell unit (or unit cell). An example of the voltage sensor 170 will be described in more detail with reference to FIG. 3.

Figure 2:
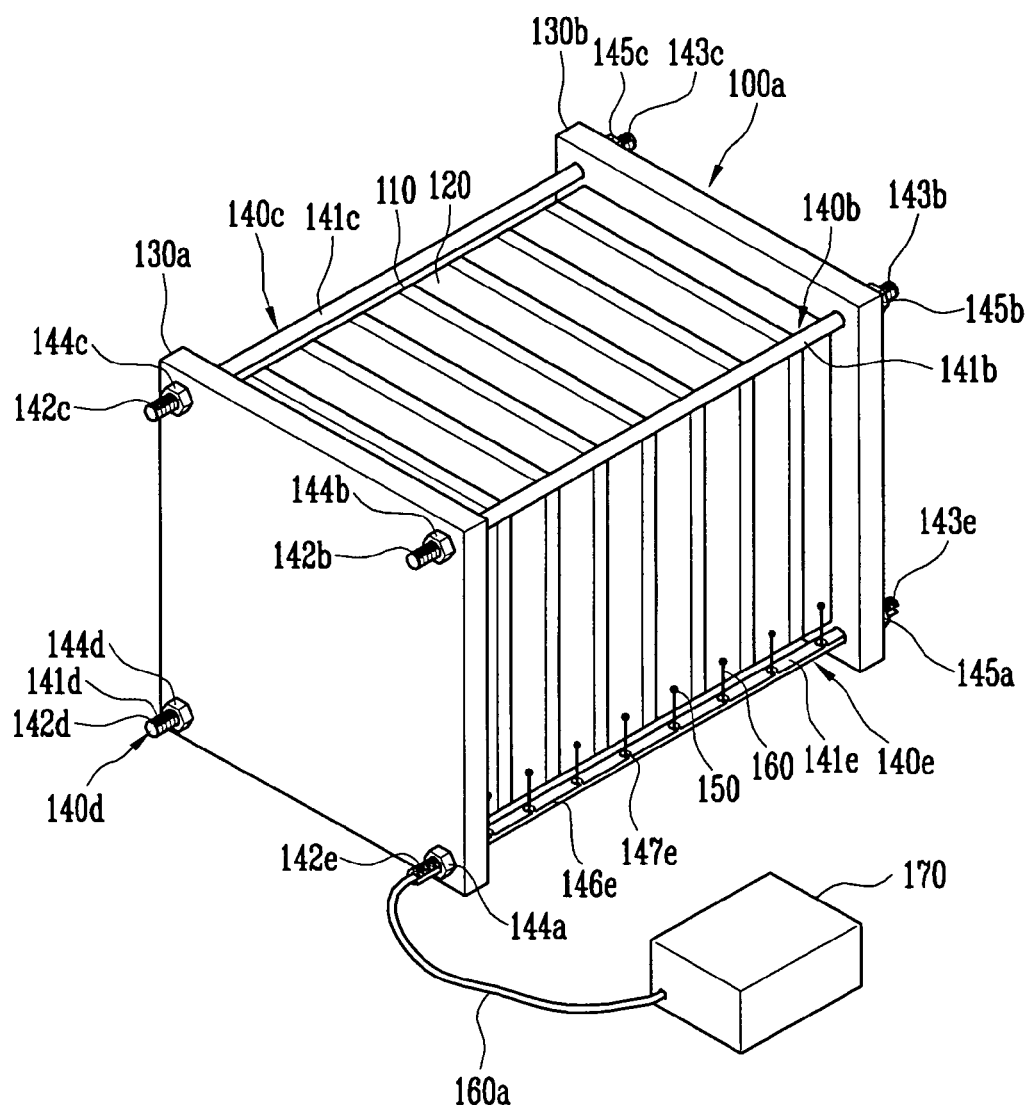
FIG. 2 is a perspective view of a cell voltage measurer for a fuel cell stack according to another embodiment of the present invention.

FIG. 2 is a perspective view of a cell voltage measurer for a fuel cell stack 100a according to another embodiment of the present invention.

Referring to FIG. 2, the fuel cell stack 100a includes an MEA 110, a separator 120 stacked on and electrically coupled to opposite sides of the MEA 110, end plates 130a and 130b, and fastening mechanisms 140e, 140b, 140c and 140d, which form one or more cell units (or unit cells). A cell voltage measurer according to this embodiment of the present invention is connected to the fuel cell stack 100 through at least one of the fastening mechanisms 140e, 140b, 140c and 140d of the fuel cell stack 100 to stably measure a cell voltage of each cell unit (or unit cell) provided in the fuel cell stack 100.

According to this embodiment, the cell voltage measurer includes a plurality of terminals 150 inserted in and fastened with each separator 120 of the fuel cell stack 100a; a plurality of wiring lines 160 electrically connected to each terminal 150; and a voltage sensor 170 electrically connected with the plurality of wiring lines 160 and adapted to measure one or more voltages respectively applied at the one or more wiring lines 160. The plurality of wiring lines 160 are coupled to the fastening mechanisms 140e. Here, the fastening mechanisms 140e are formed with a lateral opening 146e through which the plurality of wiring lines 160 pass, and a plurality of slits 147e provided corresponding to the separators 120 and through which the wiring lines 160 respectively pass. Here, the fastening mechanisms 140e may have a bar-shaped body (or a threaded body or formed as a fastening bar) 141e, and the lateral opening 146e may be formed from one end 142e to another end 143e of the bar-shaped body 141e of the fastening mechanisms 140e; however, the invention is not thereby limited. Alternatively, the fastening mechanisms 140e may have a structure such that the lateral opening 146e is not formed in the end 143e. The slit 147e may be provided corresponding to each separator 120 and having a width and a length to properly and easily align and settle the wiring lines 160 from the lateral opening 146e; however, the invention is not thereby limited.

In the cell voltage measurer according to this embodiment, the fastening mechanisms has a structure such that the plurality of wiring lines 160 can be inserted in its inside or its opening, and a structure that defined a position of where each wiring line 160 is withdrawn, so that the wiring line 160 is blocked or prevented from being deteriorated or damaged due to direct contact with the stack. Further, in this embodiment, the end of the wiring line 160 and the terminal 150 for measuring the voltage of each cell unit (or unit cell) are stably and easily coupled to each other. Therefore, according to one embodiment of the present invention, a separate member for protecting the wiring line and/or a separate member for holding/guiding the wiring line are not needed, so that the structure of the embodiment of the present invention is simplified as compared with an example needing the separate member for protecting the wiring line and/or the separate member for holding/guiding the wiring line.

Figure 3:
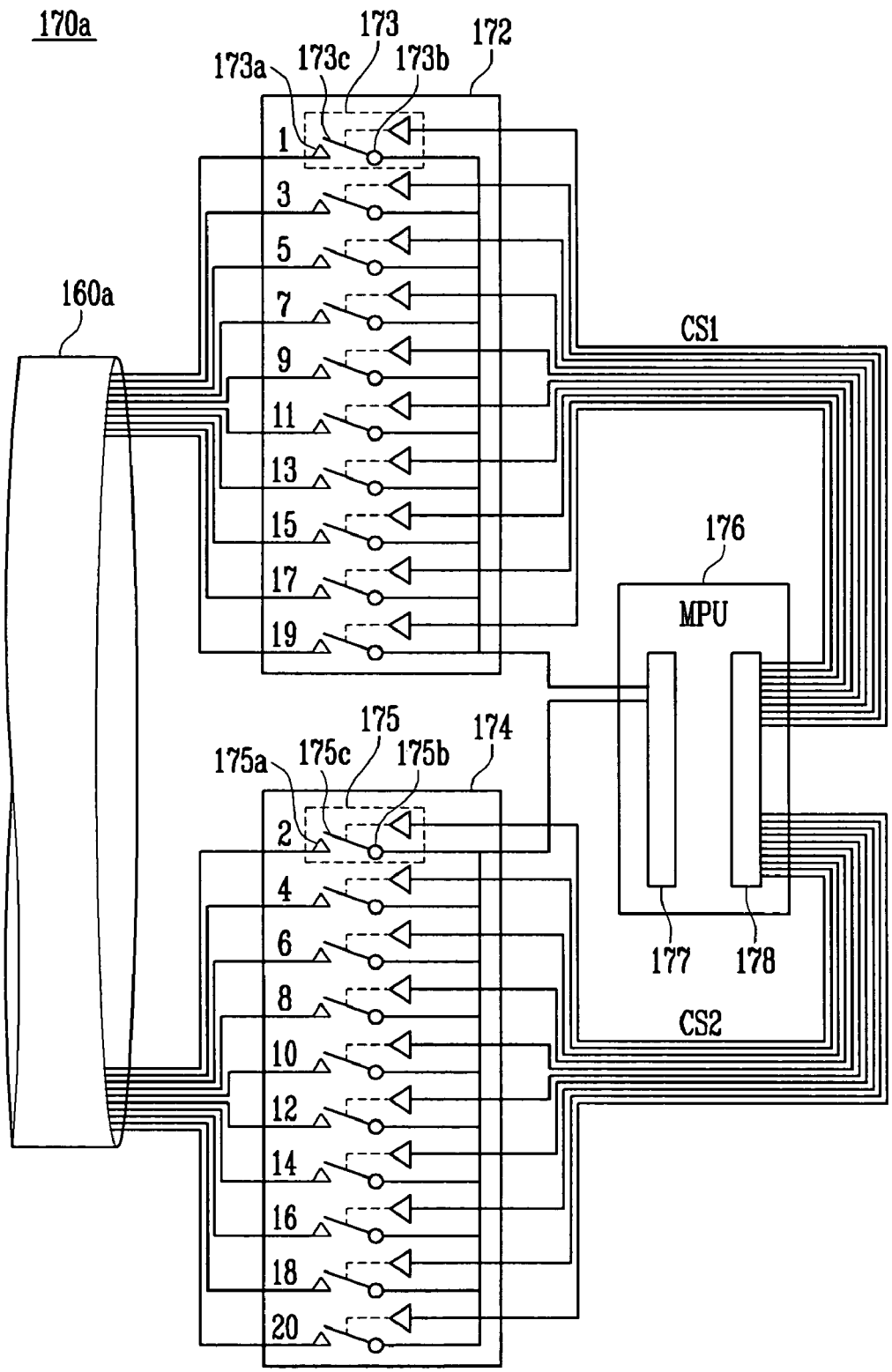
FIG. 3 is a block diagram of a voltage sensor provided in a cell voltage measurer for a fuel cell stack according to an embodiment of the present invention.

FIG. 3 is a block diagram of a voltage sensor provided in a cell voltage measurer for a fuel cell stack according to an embodiment of the present invention.

Referring to FIG. 3, the voltage sensor 170a of the cell voltage measurer includes first and second switching units 172 and 174 to measure each voltage of the plurality of cell units (or unit cells), and a switching controller 176 to control the first and second switching units 172 and 174.

The first switching unit 172 includes a plurality of switching mechanisms 173 turned on/off in response to a control signal CS1. The plurality of switching mechanisms 173 include input terminals 173a connected in sequence to the terminals connected to the odd-numbered cell units (or unit cells) among the cell units (or unit cells) of the fuel cell stack, respectively; output terminals 173b connected to the switching controller 176 (as a single or one output terminal); and control terminals 173c. The plurality of switching mechanisms 173 are selectively turned on and off in response to the control signal CS1 of the switching controller 176.

Similar to the first switching unit 172, the second switching unit 174 includes a plurality of switching mechanisms 175 turned on/off in response to a control signal CS2. The plurality of switching mechanisms 175 include input terminals 175a connected in sequence to the terminals connected to the even-numbered cell units among the cell units of the fuel cell stack, respectively; output terminals 175b connected to the switching controller 176 (as a single or one output terminal); and control terminals 175c. The plurality of switching means 175 are selectively turned on and off in response to the control signal CS2 of the switching controller 176.

The switching mechanisms 173 and 175 can be implemented by a semiconductor device such as a field effect transistor (FET) or the like, and the first and the second switching units 172 and 174 can be implemented by a semiconductor chip.

The switching controller 176 includes an input terminal 177 connected to the output terminals of the first and second switching units 172 and 174, and an output terminal 178 connected to the control terminal of the first and second switching units 172 and 174. The switching controller 176 senses the voltage applied at (or between) the output terminals of the first and second switching units 172 and 174. In other words, the switching controller 176 generates the control signals CS1 and CS2, and transmits the control signals CS1 and CS2 to the switching mechanisms 173 of the first switching unit 172 and the switching mechanisms 175 of the second switching unit 174, thereby sensing the voltage of all cell units (or unit cells) in sequence or sensing the voltage of a certain cell (or cell unit). Here, the control signals CS1 and CS2 can be transmitted to the control terminals 173c and 175c with signal amplification.

The input terminal 177 can be implemented by an analog-digital converter, and the switching controller 176 can be implemented by a digital signal processing unit (DPU) such as a microprocessor unit (MPU).

For example, the DPU includes various fuel cell controllers that have an arithmetic logic unit (ALU) to perform calculation, a register to temporarily store data and command(s), and a controller to control operation of the fuel cell stack. Further, the DPU includes at least one of processors having various architectures, such as Alpha of Digital; MIPS of MIPS Technologies, NEC, IDT, Siemens, etc.; x86 of Intel and Cyrix, AMD and Nexgen; and Power PC of IBM and Motorola.

Figure 4:
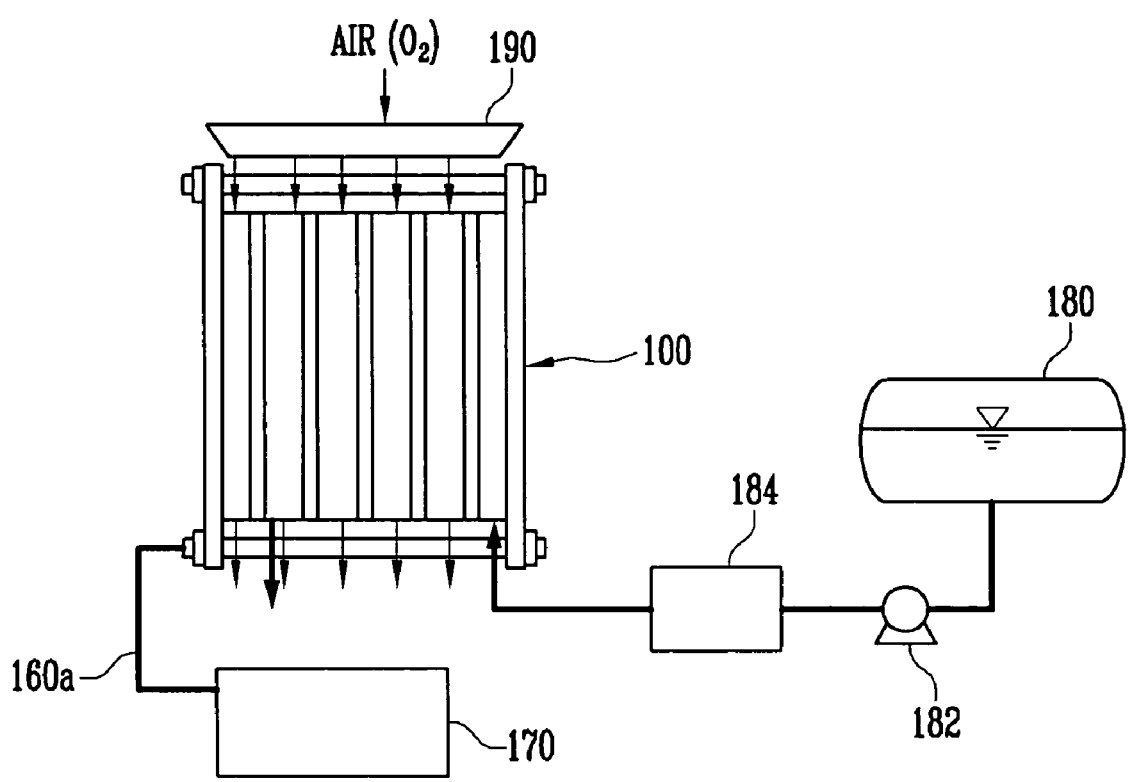
FIG. 4 is a schematic block diagram of a fuel cell system using a cell voltage measurer according to an embodiment of the present invention.

FIG. 4 is a schematic block diagram of a fuel cell system using a cell voltage measurer according to an embodiment of the present invention. Below, configurations of a fuel cell stack 100 including a cell voltage measurer is substantially equal to the stack 100 of FIG. 1 and the stack 100a of FIG. 2.

Referring to FIG. 4, a fuel cell system 200 includes the fuel cell stack 100; a cell voltage measurer having a cable 160a and a voltage sensor 170; a fuel feeder; and an oxidant feeder 190.

In more detail, the fuel cell stack 100 includes an MEA using a solid polymer membrane as an electrolyte membrane.

The electrolyte membrane may include one or more hydrogen ion conductive polymers selected from a group consisting of perfluoride polymer, benzimidazole polymer, polyimide polymer, polyetherimide polymer, polyphenylenesulfide polymer, polysulfone polymer, polyethersulfone polymer, polyetherketone polymer, polyether-etherketone polymer, polyphenylquinoxaline polymer, and combinations thereof; however, the invention is not thereby limited. In one embodiment, the electrolyte membrane includes one or more hydrogen ion conductive polymers selected from a group consisting of poly(perfluorosulfone acid), poly(perfluorocarboxyl acid), copolymer of fluorovinylether and tetrafluoroethylene including sulfonic acid, defluoride polyetherketone sulfide, aryl ketone, poly(2,2'-(m-phenylene)-5,5'-bibenzimidazole) poly(2,5-benzimidazole), and combinations thereof; however, the invention is not thereby limited.

Each of the anode electrode and the cathode electrode placed on opposite sides of the electrolyte membrane may include a catalyst layer and a diffusing layer. Further, the diffusing layer may include a microporous layer and a backing layer; however, the invention is not thereby limited The catalyst layer changes a reaction speed to quickly cause a chemical reaction between the fuel and the oxidant supplied to the respective electrodes. The microporous layer is implemented by coating the backing layer with a carbon layer. The microporous layer uniformly distributes fuel, water, air, etc.; collects produced electricity; and protects materials of the catalyst layer from being disintegrated (or washed away) by the fluid. The backing layer is implemented by a carbon material such as a carbon cloth, a carbon paper, etc., and supports the catalyst layer or the electrode. The backing layer diffuses a reaction material toward the catalyst layer, thereby allowing the reaction material to easily reach the catalyst layer.

The catalyst layer may include one or more metal catalysts selected from a group consisting of one or more transition metals selected from a group consisting of platinum, ruthenium, osmium, platinum-ruthenium alloy, platinum-osmium alloy, platinum-palladium alloy, platinum-M alloy (where M includes Ga, Ti, V, Cr, Mn, Fe, Co, Ni, Cu and Zn), and combinations thereof; however, the invention is not thereby limited.

Further, the catalyst layer may include one or more metal catalysts selected from a group consisting of platinum deposited on supports, ruthenium, osmium, platinum-ruthenium alloy, platinum-osmium alloy, platinum-palladium alloy, platinum-M alloy (where M includes one or more transition metals selected from a group consisting of Ga, Ti, V, Cr, Mn, Fe, Co, Ni, Cu and Zn), and combinations thereof. Here, the supports can include any material as long as it is conductive. The supports may be carbon; however, the invention is not thereby limited The microporous layer may include one or more carbon materials selected from a group consisting of graphite, carbon nanotube (CNT), fullerene ($C_{60}$), activated carbon, vulcan, ketjen black, carbon black, and carbon nanohorn. Further, the microporous layer may include one or more binders selected from a group consisting of poly(perfluorosulfone acid), poly (tetrafluoroethylene), fluorinated ethylene-propylene, and combinations thereof.

Also, the fuel cell stack 100 includes separators alternately stacked with MEAs.

The separator includes a certain (or predetermined) material that is non-porous (or substantially non-porous) to the fuel and the oxidant (e.g., air) to separate the fuel and the oxidant, has good electric conductivity, and a certain heat conductivity for controlling the temperature of the fuel cell. Further, the separator has mechanical strength strong enough to withstand a force of clamping the fuel cell stack 100, and is corrosion resistance to hydrogen ions.

The fuel cell stack 100 is assembled by stacking the MEAs and the separators, placing the pair of end plates on the opposite sides of the stacked structure, and fastening the pair of end plates by fastening mechanisms with a certain (or predetermined) fastening force.

The cell voltage measurer includes a plurality of terminals electrically connected to the plurality of separators, a plurality of wiring lines electrically connected to the plurality of terminals, and a fastening bar included in the fastening mechanisms and formed with a hollow through which the plurality of wiring lines pass and with one or more hole respectively through which one or more of the wiring lines pass. Further, the fuel cell measurer includes a voltage sensor electrically connected with the plurality of wiring lines withdrawn from the hollow of the fastening bar to sense the voltage applied at the plurality of wiring lines. Here, repetitive descriptions of the foregoing cell voltage measurer will be avoided.

The fuel feeder includes a fuel tank 180, a fuel pump 182, and a reformer 184. The fuel tank 180 stores hydrogen-containing fuel (or fuel containing hydrogen). The fuel pump 182 supplies the fuel from the fuel tank 180 to the fuel cell stack 100. The reformer 184 reforms the fuel and supplies a reformed gas including abundant hydrogen gas to the anode electrode of the fuel cell stack 100. Here, the reformer 184 can be removed when the fuel cell stack 100 is capable of directly using liquid fuel.

The oxidant feeder 190 supplies the oxidant, e.g., oxygen gas or air, to the cathode electrode of the fuel cell stack 100. The oxidant feeder 190 can be implemented by an air pump, a blower, etc.

According to the present invention, the wiring line for measuring each voltage of each of the cells (or cell units) of the fuel cell stack is protected, and its structure is simplified, so that each voltage of each of the cells is stably measured, thereby stably controlling the fuel cell stack to operate according to the measured state of each cell and decreasing the deterioration of the fuel cell stack. Thus, the lifespan of the fuel cell stack is extended.

As described above, an embodiment of the present invention provides a cell voltage measurer of a fuel cell stack and a fuel cell system using the same, in which the wiring line is blocked or prevented from being short-circuited by heat generated in the fuel cell stack, and its structure is simplified, thereby stably measuring the voltage of each cell (or cell unit). As the cell voltage of the fuel cell stack is stably measured, the fuel cell stack is blocked or prevented from being suddenly stopped by the stopping of a certain unit cell (or cell unit) of the fuel cell stack or when the measured voltage of a certain unit cell (or cell unit) is lower than a reference voltage.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A cell voltage measurer for a fuel cell stack comprising: membrane-electrode assemblies and separators alternatively stacked with the membrane-electrode assemblies to form a stacked structure; a pair of end plates for supporting opposite sides of the stacked structure; and fastening mechanisms for fastening the pair of end plates, at least one of the fastening mechanisms comprising a fastening bar extending along a first direction to be fastened to each of the pair of end plates and the cell voltage measurer comprising:

a plurality of terminals electrically connected to the separators, respectively; and a plurality of wiring lines passing through the fastening bar along the first direction and electrically connected to the plurality of terminals, respectively, wherein the fastening bar is formed with a hollow extending along the first direction through which the plurality of wiring lines pass, wherein the hollow is a lateral opening extending along the first direction in which the plurality of wiring lines are inserted, and wherein the fastening bar is formed with a slit extended from the lateral opening, the slit being provided corresponding to at least one of the separators, and being for allowing at least one of the wiring lines to pass therethrough.

2. The cell voltage measurer according to claim 1, further comprising a voltage sensor electrically connected with the plurality of wiring lines and being adapted to sense one or more voltages applied at the plurality of wiring lines.

3. The cell voltage measurer according to claim 2, wherein the voltage sensor comprises:

at least two switching units, each of the at least two switching units having a plurality of input terminals and an output terminal, and being adapted to selectively, electrically connect one of the input terminals with the output terminal; and a switching controller for sensing a voltage applied at the output terminals of the at least two switching units and for controlling the at least two switching units.

4. The cell voltage measurer according to claim 3, wherein the switching controller comprises a digital signal processing unit.

5. The cell voltage measurer according to claim 1, wherein the fastening mechanisms includes include metal or a complex material.

6. The cell voltage measurer according to claim 5, wherein a terminal of the terminals comprises an electrode pin adapted to insert into a groove placed in a lateral side of a corresponding one of the separators.

7. A fuel cell system comprising:
- a fuel cell stack comprising: a plurality of membrane-electrode assemblies, each of the membrane-electrode assemblies comprising an anode electrode, a cathode electrode, and an electrolyte membrane between the anode electrode and the cathode electrode; a plurality of separators alternatively stacked with the membrane-electrode assemblies to form a stacked structure; a pair of end plates supporting opposite sides of the stacked structure; and fastening mechanisms for fastening the pair of end plates, at least one of the fastening mechanisms comprising a fastening bar extending along a first direction to be fastened to each of the pair of end plates; and
- a cell voltage measurer comprising a plurality of terminals electrically connected to the plurality of separators, respectively; and a plurality of wiring lines passing through the fastening bar along the first direction and electrically connected to the plurality of terminals, respectively,
- wherein the fastening bar is formed with a hollow extending along the first direction through which the plurality of wiring lines pass,
- wherein the hollow is a lateral opening extending in the first direction in which the plurality of wiring lines are inserted, and
- wherein the fastening bar is formed with a slit extended from the lateral opening, the slit being for allowing at least one of the wiring lines to pass therethrough.

8. The fuel cell system according to claim 7, further comprising a voltage sensor electrically connected with the plurality of wiring lines and being adapted to sense one or more voltages applied at the plurality of wiring lines.

9. The fuel cell system according to claim 8, wherein the voltage sensor comprises:
- at least two switching units, each of the at least two switching units having a plurality of input terminals and an output terminal, and being adapted to selectively, electrically connect one of the input terminals with the output terminal; and
- a switching controller for sensing a voltage applied at the terminals of the at least two switching units and for controlling the at least two switching units.

10. The fuel cell system according to claim 7, further comprising a fuel feeder adapted to supply the anode electrode with a fuel containing hydrogen.

11. The fuel cell system according to claim 10, further comprising a reformer adapted to reform the fuel supplied from the fuel feeder to the anode electrode.

12. The fuel cell system according to claim 10, wherein the fuel containing hydrogen is a liquid fuel, and wherein the fuel cell stack is directly supplied with the liquid fuel.

13. The fuel cell system according to claim 10, further comprising an oxidant feeder adapted to supply the cathode electrode with an oxidant.

14. The fuel cell system according to claim 7, wherein the electrolyte membrane comprises a solid polymer membrane.

* * * * *

UNITED STATES PATENT AND TRADEMARK OFFICE
CERTIFICATE OF CORRECTION

| | | |
|---|---|---|
| PATENT NO. | : 7,910,261 B2 | Page 1 of 1 |
| APPLICATION NO. | : 11/543724 | |
| DATED | : March 22, 2011 | |
| INVENTOR(S) | : Jin Hong An et al. | |

It is certified that error appears in the above-identified patent and that said Letters Patent is hereby corrected as shown below:

In the Claims

Column 9, Claim 5, line 5          Delete "includes"

Signed and Sealed this
Sixth Day of March, 2012

David J. Kappos
*Director of the United States Patent and Trademark Office*